Figure 1:
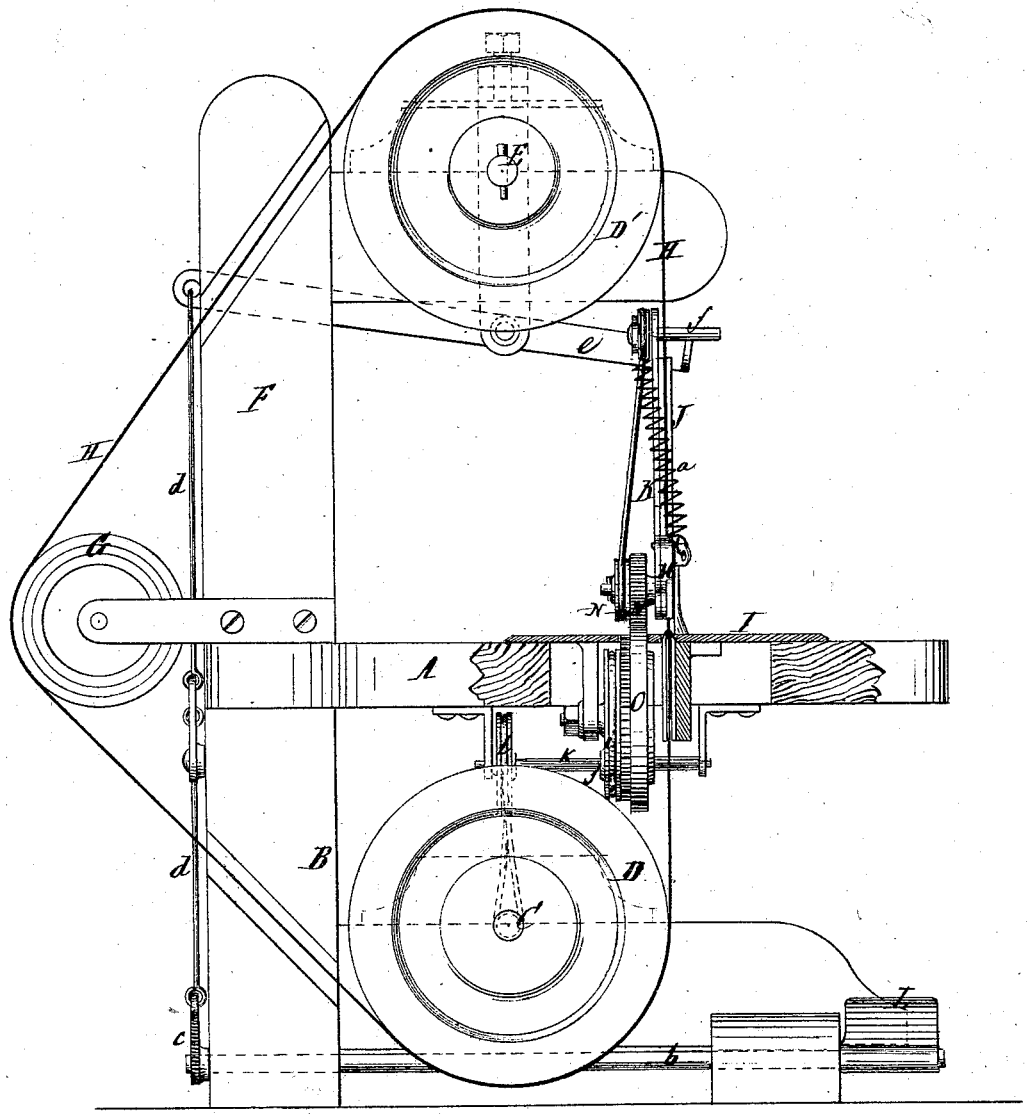

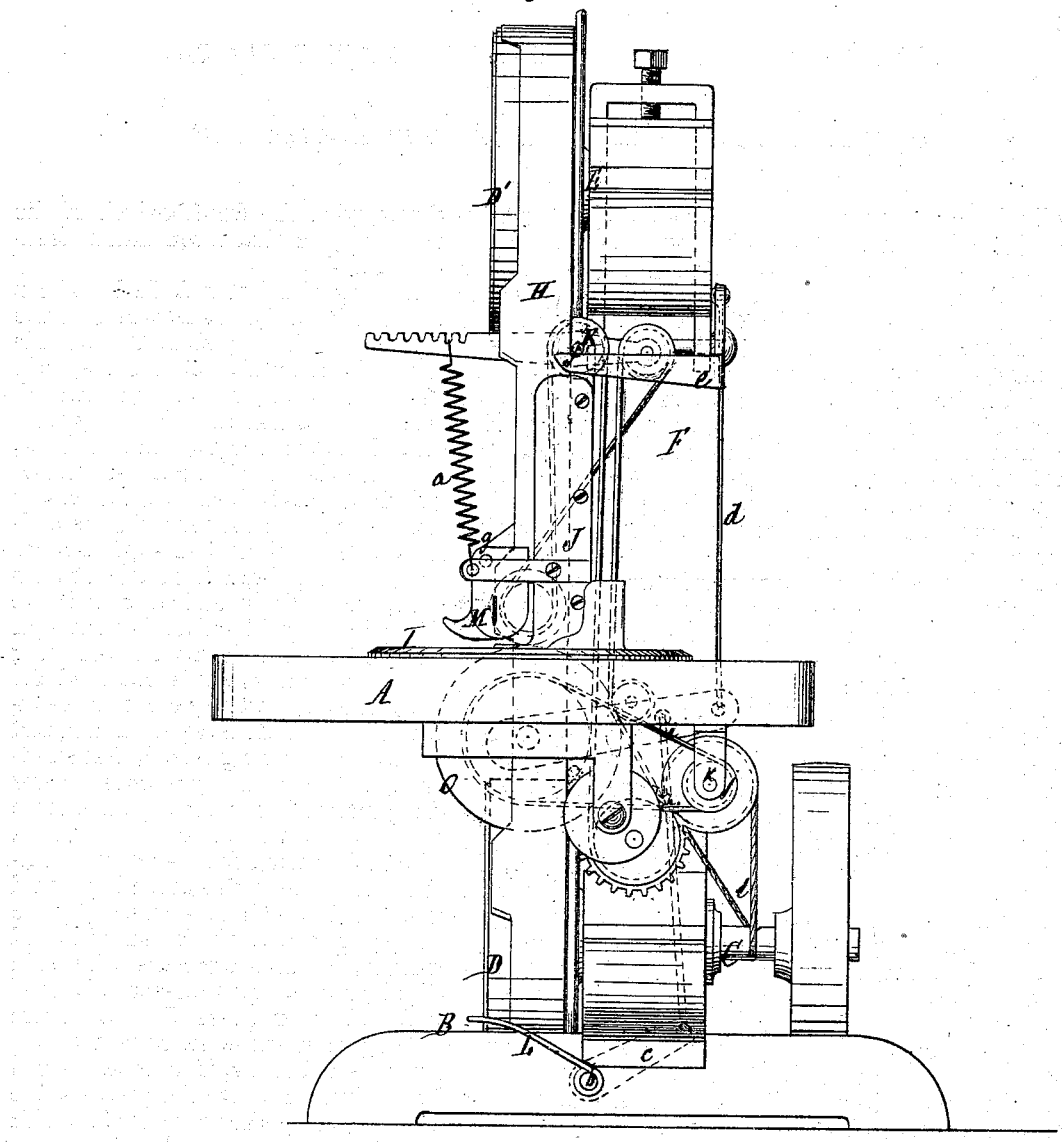

A. WARTH.
Machines for Cutting Cloth.

No. 125,638.

2 Sheets--Sheet 1.

Patented April 9, 1872.

125,638

UNITED STATES PATENT OFFICE.

ALBIN WARTH, OF STAPLETON, NEW YORK.

IMPROVEMENT IN MACHINES FOR CUTTING CLOTH.

Specification forming part of Letters Patent No. 125,638, dated April 9, 1872.

*To all whom may concern:*

Be it known that I, ALBIN WARTH, of Stapleton, in the county of Richmond and State of New York, have invented a new and useful Improvement in Machine for Cutting Cloth; and I do hereby declare the following to be a full, clear, and exact description thereof, which will enable those skilled in the art to make and use the same, reference being had to the accompanying drawing forming a part of this specification, in which drawing—

Figure 1 represents a sectional side view of my machine. Fig. 2 is a sectional front view of the same.

Similar letters indicate corresponding parts.

This invention relates to certain improvements to that class of machines for cutting textile fabrics, leather, paper, or other materials, in which an endless band-saw is used as the cutting instrument. My improvements consist in the arrangement of one or more guide-pulleys in the rear of the drum, over which the endless band-saw runs, in such a manner that the distance between the upward and the downward branches of the saw can be increased to any desired extent, and sufficient room is obtained between said branches of the saw to manipulate the material to be cut, said band-saw traveling in its circuit through a guide which rises from the platform or table, and which passes, with the saw, through the cut opened by said saw in the material to be cut in such a manner that the lateral pressure of the material on the saw is reduced, and that the saw is prevented from twisting when the material is turned; also in the arrangement of an upper and lower feed-wheel, which are geared together, in combination with an endless band-saw, in such a manner that the material to be cut is uniformly fed toward the saw; also in the arrangement of a protector, hinged to the presser-slide, which carries the feed-wheel, in combination with the endless band-saw, for the purpose of preventing persons from injuring themselves by coming in contact with the saw, and also to act as guide for the direction of the cut; also, in the arrangement of a foot-lever, in combination with the presser-foot, so as to control the position of said presser-foot without the aid of the hand; also, in connecting the feed-wheels, by a belt or gear-wheels, with the driving-shaft of the saw in such a manner that a continuous feed-motion is produced.

In the drawing, the letter A designates a table, supported by a frame, B, which forms the bearings for the driving-shaft C. On this shaft is mounted a drum, D, which corresponds to a similar drum, D', mounted on a stud, E, which is secured in a standard, F, rising from the table A. Between the two drums D D', and in their rear, is placed a guide-roller, G, the axle of which has its bearings in arms or brackets extending from the rear of the standard F; and by the action of this guide-roller the upwardly-moving branch of the endless band-saw H, which is stretched round the drums D D' and said guide-roller, is carried at such a distance from the downwardly-moving branch that sufficient room is obtained for manipulating the material to be cut on the table A. On the table A is secured a metal plate, I, from which rises a guide, J, that straddles the back of the saw, and prevents the saw from getting jammed in the kerf, and also from being twisted when the material is turned round on the table during the operation of cutting. To the inner side of this guide is secured the presser-slide K, which is depressed by the action of a spring, $a$, and which can be raised by a foot-lever, L, that connects with said presser-slide by means of a rock-shaft, $b$, lever $c$, and rod $d$, and lever $e$, (see Fig. 1.) From the top of the presser-slide extends a pin, $f$, which serves as a handle, if it is desired to raise said slide by hand. To the presser-slide is secured, by a pivot, $g$, the protector M, which can be turned up or down, and which, when turned down, covers the saw and prevents the workman from cutting his fingers. The point of this protector also serves as a guide to direct the course of the saw during the operation of cutting. The material to be cut is fed toward the saw by the action of two feed-wheels, N O, one of which is mounted on a stud extending from the presser-slide, while the other is situated beneath the table, and has its bearings on a stud mounted in a hanger projecting from the lower surface of the plate I. The two feed-wheels are geared together by cog-wheels and belts, so that they revolve together in opposite directions, and that the material to be cut receives a uniform feed-motion, particularly if many thicknesses of cloth or other material are to be cut simultaneously.

The connection between the two feed-wheels may be effected in many different ways; and I do not wish to confine myself, in this respect, to the particular means shown in the drawing, but I reserve the right to change this connection as may be desirable.

The lower feed-wheel connects, by a belt, $i$, with a pulley, $j$, mounted on a shaft, $k$, that connects, by a belt, $l$, with the driving-shaft C; or, if desired, the connection between the driving-shaft and the feed-wheel can be effected by worms, worm-wheels, and gear-wheels, so that the feed-wheels N O receive a continuous rotary motion whenever the driving-shaft is set in motion, and consequently the material to be cut receives a uniform and continuous feed-motion. The teeth of the saw are set at a certain distance apart, so that the strain on the saw, during the operation of cutting, is reduced, and the shape of the saw-teeth is such that their cutting-edges can be sharpened without reducing the width or impairing the strength of the saw.

I do not claim broadly as my invention the use of an endless band-saw for cutting cloth or other textile fabrics, such being shown in Patent No. 117,352; but

What I claim as new, and desire to secure by Letters Patent, is—

1. The combination, with an endless band-saw, of two feed-wheels, N O, one above and the other below the platform supporting the material to be cut, said feed-wheels being geared together so as to have a continuous motion, substantially in the manner shown and described.

2. The guide J, rising from the platform I, for preventing twisting of the endless band-saw H, in combination with the drums D D' and one or more guide-rollers, G, all arranged and operating substantially as set forth.

3. The combination of a protector, M, with an endless band-saw, H, drums D D', and one or more guide-rollers, G, substantially as set forth.

ALBIN WARTH.

Witnesses:
W. HAUFF,
E. F. KASTENHUBER.